(12) United States Patent
Yun et al.

(10) Patent No.: US 11,365,577 B2
(45) Date of Patent: Jun. 21, 2022

(54) SPINDLE STRUCTURE FOR PREVENTING SLIDING DOORS FROM SWAYING

(71) Applicants: Hyundai Motor Company, Seoul (KR); Kia Motors Corporation, Seoul (KR); Pyeong Hwa Automotive Co., Ltd., Daegu (KR)

(72) Inventors: Hyung-In Yun, Seoul (KR); Seong-Tae Hong, Daegu (KR); Ji-Hak Yoo, Daegu (KR)

(73) Assignees: Hyundai Motor Company, Seoul (KR); Kia Motors Corporation, Seoul (KR); Pyeong Hwa Automotive Co., Ltd., Daegu (KR)

( * ) Notice: Subject to any disclaimer, the term of this patent is extended or adjusted under 35 U.S.C. 154(b) by 103 days.

(21) Appl. No.: 16/857,743

(22) Filed: Apr. 24, 2020

(65) Prior Publication Data
US 2021/0172238 A1 Jun. 10, 2021

(30) Foreign Application Priority Data
Dec. 10, 2019 (KR) ........................ 10-2019-0163414

(51) Int. Cl.
| E05F 15/652 | (2015.01) |
| E05D 15/30 | (2006.01) |
| B60J 5/06 | (2006.01) |
| E05F 15/655 | (2015.01) |

(52) U.S. Cl.
CPC .............. *E05F 15/652* (2015.01); *B60J 5/06* (2013.01); *E05D 15/30* (2013.01); *E05F 15/655* (2015.01); *E05Y 2900/531* (2013.01)

(58) Field of Classification Search
CPC .... E05D 15/1042; E05D 15/30; E05F 15/652; E05F 15/655; B60J 5/06
See application file for complete search history.

(56) References Cited

U.S. PATENT DOCUMENTS

| 4,703,585 | A | * | 11/1987 | Koch | ..................... E05D 15/48 49/223 |
| 5,507,119 | A | * | 4/1996 | Sumiya | ................... E05F 15/56 49/218 |
| 2016/0046176 | A1 | * | 2/2016 | Prevost | .................. B60J 5/0477 105/343 |
| 2016/0356069 | A1 | | 12/2016 | Choi et al. | |
| 2017/0234048 | A1 | * | 8/2017 | Ungetheim | ............. E05D 15/30 49/177 |
| 2021/0207415 | A1 | * | 7/2021 | Marega | ...................... B60J 5/06 |

FOREIGN PATENT DOCUMENTS

GB          2581008       * 8/2020
KR     101684536 B1     12/2016

* cited by examiner

*Primary Examiner* — Gregory J Strimbu
(74) *Attorney, Agent, or Firm* — Slater Matsil, LLP

(57) ABSTRACT

A spindle structure includes a lower rail mounted at a lower side of a vehicle body, a lower rail roller unit rollably connected to the lower rail, a lower rail swing arm rotatably connected to the lower rail roller unit and a door, a lower guide rail mounted on the door and configured to form a lower guide route, and a spindle assembly positioned at one end of the lower rail, the spindle assembly including a spindle connected to a fixing unit fixed to the vehicle body, the spindle having one end rollably connected to the lower guide rail, having a threaded portion formed on an outer circumferential surface thereof, and being configured to be movable in a threaded manner between the vehicle body and the door.

20 Claims, 7 Drawing Sheets

SPINDLE STRUCTURE FOR PREVENTING SLIDING DOORS FROM SWAYING

CROSS-REFERENCE TO RELATED APPLICATIONS

This application claims priority to Korean Patent Application No. 10-2019-0163414, filed in the Korean Intellectual Property Office on Dec. 10, 2019, which application is hereby incorporated herein by reference.

TECHNICAL FIELD

The present invention relates to a spindle type structure for preventing opposite sliding doors from swaying.

BACKGROUND

In general, a vehicle has an occupant compartment having a predetermined size in which a driver or an accompanied occupant may be seated, and occupant compartment opening/closing doors are installed on a vehicle body to open or close the occupant compartment.

Sliding type occupant compartment opening/closing doors include a front sliding door installed at a front side in a longitudinal direction of a vehicle and a rear sliding door installed at a rear side in the longitudinal direction of the vehicle. The front sliding door and the rear sliding door are typically installed to be moved along rails mounted on a vehicle body or the doors.

However, the sliding type occupant compartment opening/closing door in the related art requires three rails (an upper rail, a center rail, and a lower rail) that support an upper portion, a middle portion, and a lower portion of the door, respectively, during the process of opening or closing the door, and the sliding type occupant compartment opening/closing door also requires components related to the rails. For this reason, the sliding type occupant compartment opening/closing door in the related art has a problem in that the weight of the vehicle and the number of components are increased and a degree of design freedom of the vehicle deteriorates.

Therefore, there has been developed a two-rail type door system for a vehicle in which a sliding door is slidably supported only with center and lower rails. For example, Korean Patent No. 10-1684536 and corresponding U.S. Pat. No. 9,777,811 (Sliding Door System for Vehicle) in the related art discloses that a door rail (i.e., a center rail) is mounted on a sliding door, a vehicle body rail (i.e., a lower rail) is mounted on a vehicle body, and the sliding door is opened or closed as a center slider coupled to the door rail and a lower slider coupled to the vehicle body rail are moved.

However, referring to FIGS. 1 and 2, in the sliding structure in the related art, as support points at which the sliding door is supported, two support points including a contact point A between the vehicle body rail and the lower slider and a contact point B between the center rail and the center slider are formed in a vertical direction. However, there is a problem in that the sliding door rotates about an imaginary axis X connecting the contact points. In addition, because the support points for the sliding door are formed only on the imaginary axis X, there remains only one contact point A in a load direction (direction of the imaginary axis X) when a load of the sliding door is applied, and as a result, the sliding door cannot be stably supported.

SUMMARY

The present invention relates to a spindle type structure for preventing opposite sliding doors from swaying. Particular embodiments relate to a spindle type structure for preventing opposite sliding doors from swaying, the spindle type structure being capable of preventing the sway of the sliding door in a width direction by means of a motion of a spindle while the sliding door is opened or closed in a vehicle mounted with the sliding door and having only center and lower rails.

Embodiments of the present invention provides a new type of structure capable of preventing sway of a sliding door and supporting a load while the sliding door is opened or closed in a vehicle mounted with the sliding door and having only center and lower rails.

An exemplary embodiment of the present invention provides a spindle type structure for preventing opposite sliding doors from swaying, the spindle type structure including a lower rail mounted in a longitudinal direction at a lower side of a vehicle body, a lower rail roller unit rollably connected to the lower rail, a lower rail swing arm rotatably connected to the lower rail roller unit and the door, a lower guide rail mounted on the door and configured to form a lower guide route in the longitudinal direction of the vehicle body, and a spindle assembly positioned at one side of the lower rail, and including a spindle connected in the longitudinal direction to a fixing unit fixed to the vehicle body, the spindle having one end rollably connected to the lower guide rail, and having a threaded portion formed on an outer circumferential surface thereof, such that the spindle is movable in a threaded manner between the vehicle body and the door.

According to embodiments of the present invention, because a thread frictional force is generated as a spindle moves in a threaded manner, a supporting force for supporting a door is increased.

According to embodiments of the present invention, because inner walls of a lower guide groove are formed in a width or height direction of a vehicle body, the door is prevented from swaying in the width direction (L direction) or the height direction (H direction).

Embodiments of the present invention further includes a motor provided on the spindle, and a control unit configured to control the motor, such that the thread movement of the spindle may be more precisely controlled while the door moves, as a result of which the door may be stably supported.

According to embodiments of the present invention, even in the case of the two-rail vehicle structure having only the center and lower rails, the door is supported at three support points, as a result of which the door may be stably supported.

DETAILED DESCRIPTION OF ILLUSTRATIVE EMBODIMENTS

Hereinafter, exemplary embodiments of a spindle type structure for preventing opposite sliding doors from swaying will be described in detail with reference to the drawings. Terms or words used herein should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

Figure 3:
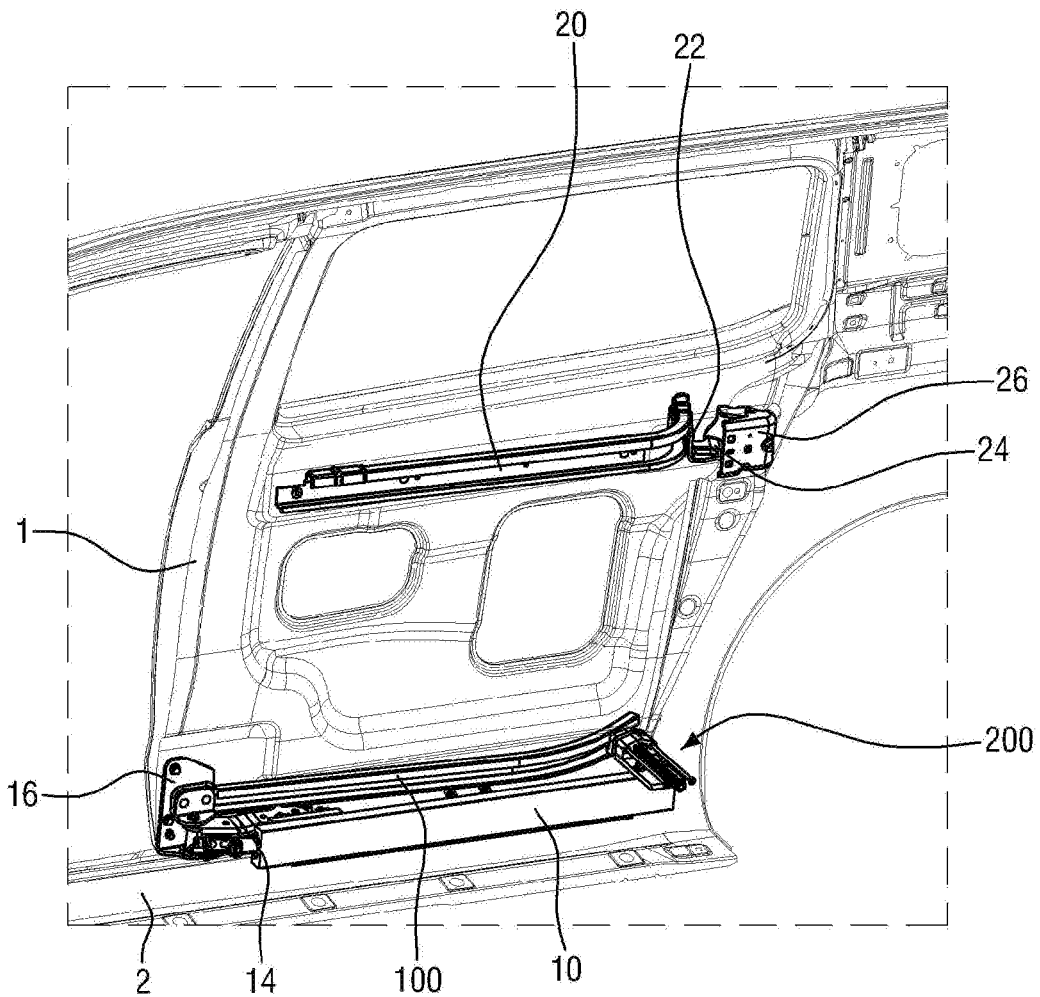
FIG. 3 is a view illustrating a state in which a spindle type sway prevention structure according to an exemplary embodiment of the present invention is mounted on a sliding door.
Figure 4:
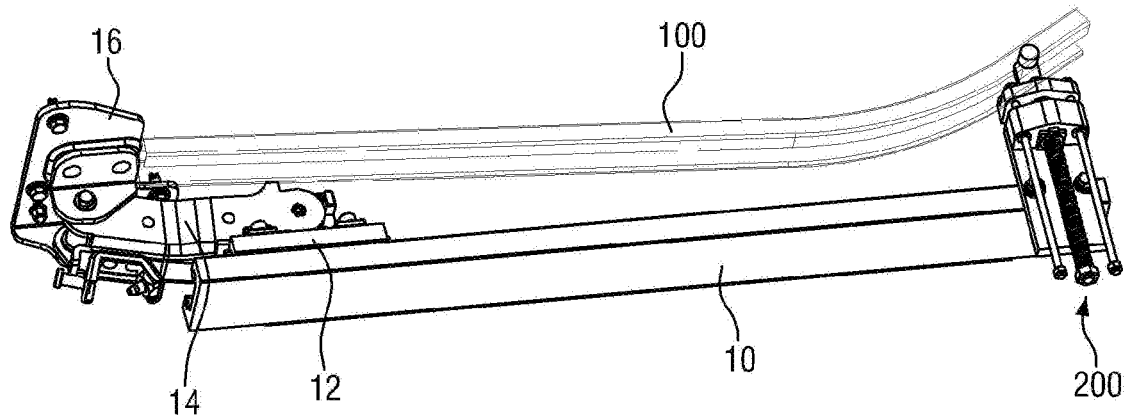
FIG. 4 is a view illustrating a spindle type sway prevention structure according to an exemplary embodiment of the present invention.
Figure 5:
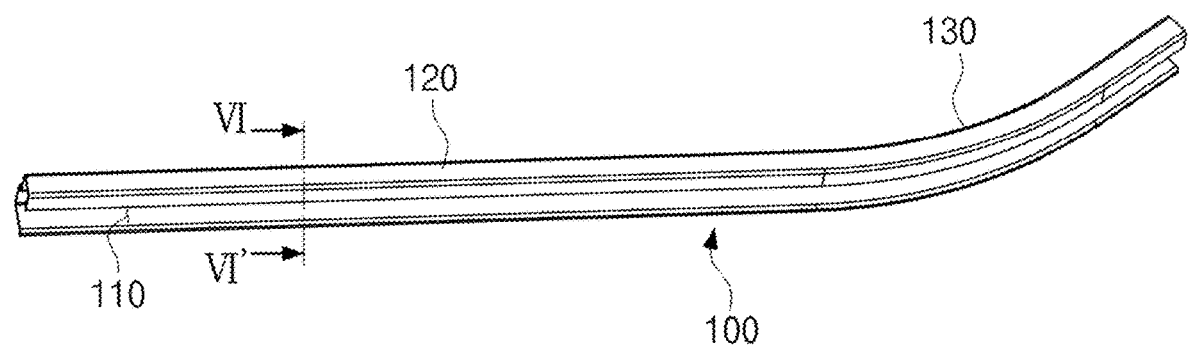
FIG. 5 is a view illustrating a lower guide rail according to an exemplary embodiment of the present invention.
Figure 6:
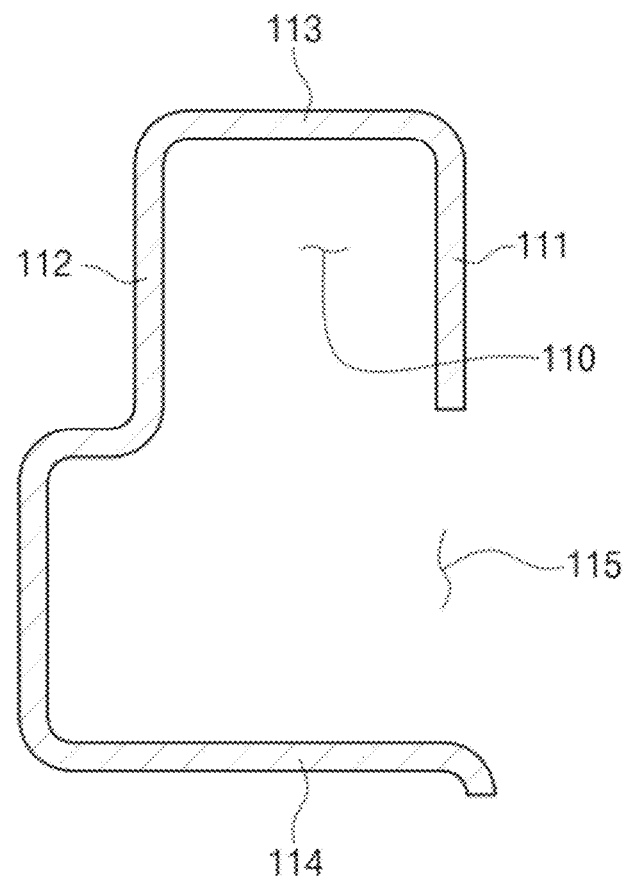
FIG. 6 is a view illustrating a cross section taken along line VI-VI in FIG. 5.
Figure 7:
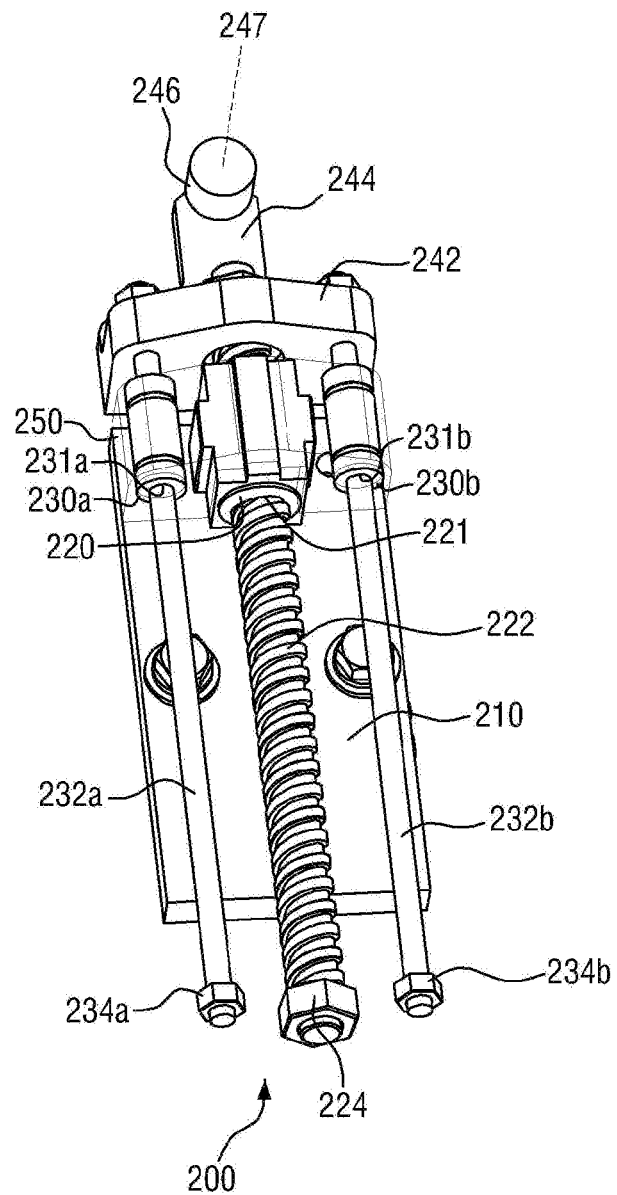
FIG. 7 is a view illustrating a spindle assembly according to an exemplary embodiment of the present invention.

FIG. 3 is a view illustrating a state in which a spindle type sway prevention structure according to an exemplary embodiment of the present invention is mounted on a sliding door, FIG. 4 is a view illustrating a spindle type sway prevention structure according to an exemplary embodiment of the present invention, FIG. 5 is a view illustrating a lower guide rail according to an exemplary embodiment of the present invention, FIG. 6 is a cross sectional view of the lower guide rail of FIG. 5, and FIG. 7 is a view illustrating a spindle assembly according to an exemplary embodiment of the present invention.

Figure 1:
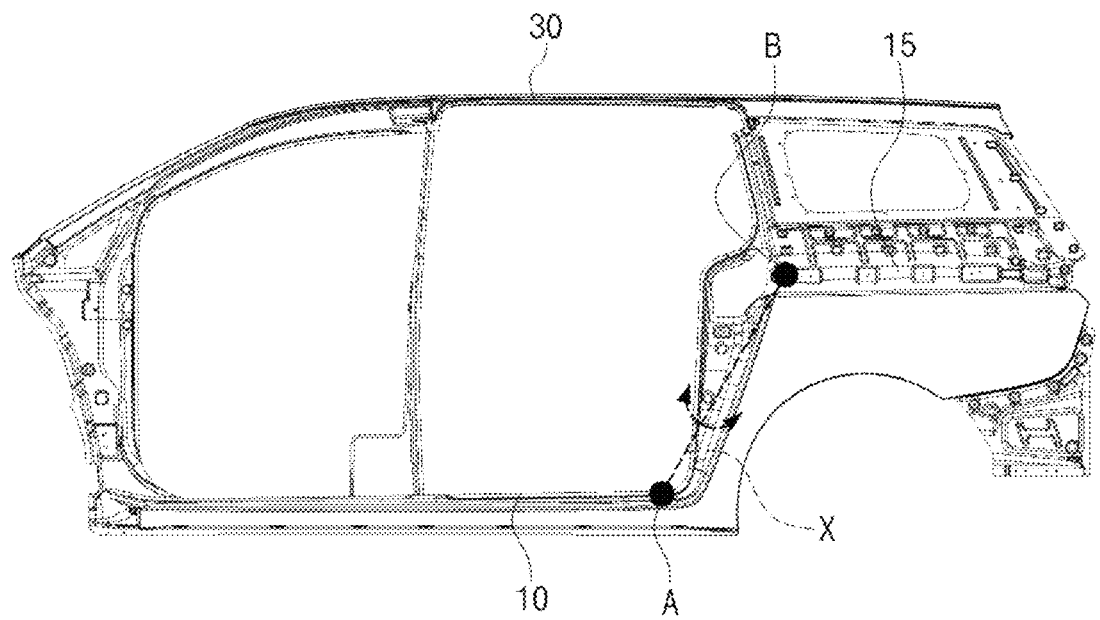
FIG. 1 is a view illustrating support points at which a sliding door for a vehicle having only center and lower rails in the related art is supported.
Figure 2:
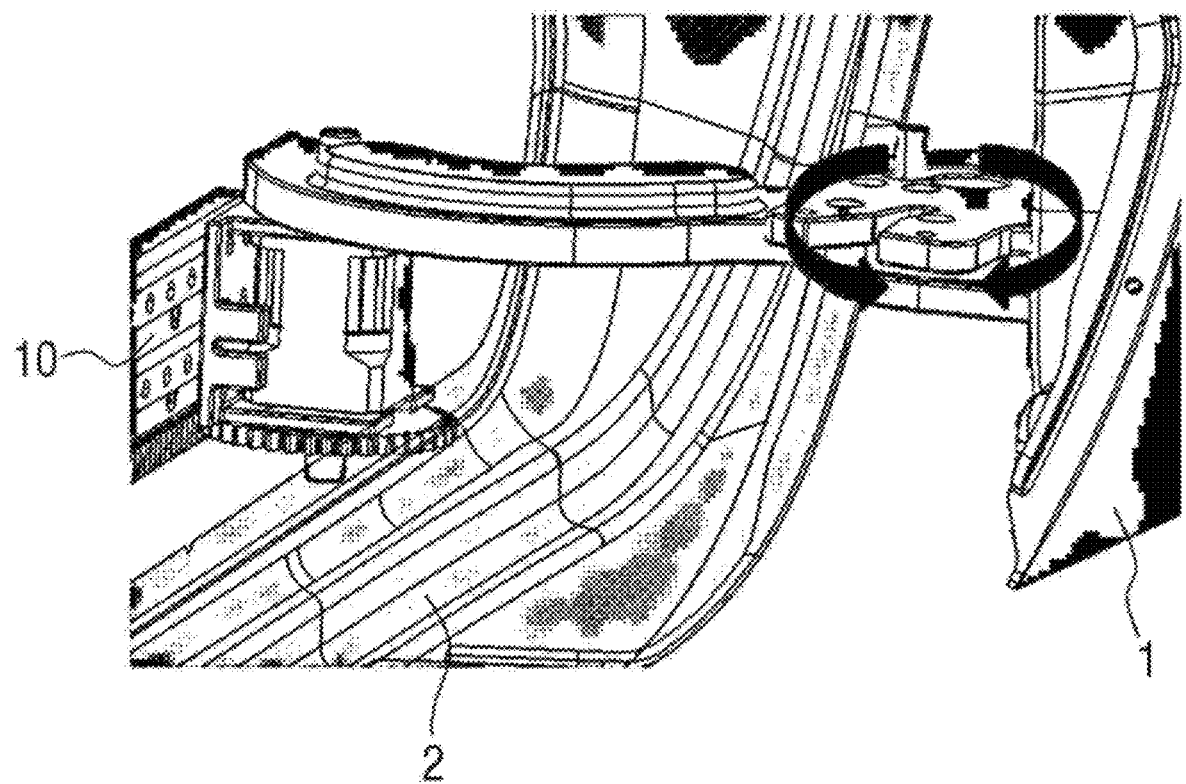
FIG. 2 is a view illustrating a state in which the sliding door illustrated in FIG. 1 is rotatable.

According to an exemplary embodiment of the present invention, a vehicle has a lower rail 10 (a rail disposed at a lower side of the vehicle) and a center rail 20 (a rail disposed at a center of the vehicle), but no upper rail 30 (a rail disposed at an upper side of the vehicle). Here, the lower rail 10 is provided on a vehicle body 2, and the center rail 20 is provided on a sliding door 1 (compared to center rail 15 in FIG. 1).

The sliding doors 1 include a front door and a rear door, and the spindle type structure for preventing opposite sliding doors from swaying according to an exemplary embodiment of the present invention is applied to the lower rail 10 of the front door or the rear door. Therefore, the spindle type structures for preventing opposite sliding doors from swaying, which are applied to the front door and the rear door, respectively, are identical in configuration and operational principle. However, in the present specification, for convenience of description, an example in which the spindle type structure for preventing opposite sliding doors from swaying is applied to any one of the sliding doors 1 will be described.

Referring to FIGS. 3 and 4, the spindle type structure for preventing opposite sliding doors from swaying according to an exemplary embodiment of the present invention is provided at lower sides of the vehicle body 2 and the door 1 and includes the lower rail 10, a lower rail roller unit 12, a lower rail swing arm 14, a lower guide rail 100, and a spindle assembly 200.

One end of the lower rail roller unit 12 is inserted into and rollably coupled to the lower rail 10 formed in a longitudinal direction of the vehicle body 2, and the lower rail roller unit 12 moves in the longitudinal direction of the vehicle body 2 by being guided by the lower rail 10.

One end of the lower rail swing arm 14 is rotatably connected to a lower swing arm mounting bracket 16 fixedly mounted inside the door 1, and the other end of the lower rail swing arm 14 is rotatably connected to the lower rail roller unit 12. Therefore, when the door 1 moves, the lower rail swing arm 14 may rotate about the lower rail roller unit 12 and may rectilinearly move along the lower rail 10.

Meanwhile, as described above, in an exemplary embodiment of the present invention, the center rail 20 is fixed to the door 1. A center rail roller unit 22 is rollably connected to the center rail 20. The center rail roller unit 22 is rotatably connected to a center swing arm mounting bracket 26 fixedly connected to the vehicle body 2 through a center rail swing arm 24.

Referring to FIG. 5, the lower guide rail 100 includes a straight portion 120 having a straight shape, and a curved portion 130 having a curved shape. The lower guide rail 100 is elongated in the longitudinal direction of the vehicle body 2 so that one end of the lower guide rail 100 is directed toward the lower swing arm mounting bracket 16. The lower guide rail 100 is fixedly connected to the door 1. The lower guide rail 100 according to an exemplary embodiment of the present invention faces the lower rail 10, but there is no limitation to a position at which the lower guide rail 100 is mounted on the door 1.

The lower guide rail 100 has a lower guide groove 110. Specifically, referring to FIG. 6, the lower guide groove 110 protrudes upward, first and second lower guide sidewalls 111 and 112 are provided at both sides of the lower guide groove 110, a lower guide upper wall 113 is formed at an upper side of the lower guide groove 110, and a lower guide lower wall 114 is formed at a lower side of the lower guide groove 110. The first and second lower guide sidewalls 111 and 112 are formed in a width direction (L direction) of the vehicle body 2, and the lower guide upper wall 113 and the lower guide lower wall 114 are formed in a height direction (H direction) of the vehicle body 2. The second lower guide sidewall 112 extends and defines an opening portion 115 together with the first lower guide sidewall 111. The second lower guide sidewall 112 is connected to the door 1, and the opening portion 115 is directed toward the vehicle body 2. The lower guide groove no extends in the longitudinal direction of the vehicle body 2 and forms a lower guide route.

The spindle assembly 200 serves to connect the vehicle body 2 and the door 1 and prevent the door 1 from swaying and includes a fixing unit 210, a spindle socket 220, guide sockets 230a and 230b, a spindle 222, guide brackets 242 and 244, a guide bearing 246, and guide rods 232a and 232b.

The fixing unit 210 is positioned at one side of the lower rail 10 and fixed to the vehicle body 2. The spindle socket 220 is fixedly connected to the fixing unit 210, and the spindle socket 220 has a spindle socket hole 221 into which the spindle 222 is penetratively inserted. Here, a thread corresponding portion is formed on an inner circumferential surface of the spindle socket hole 221. In addition, the guide sockets 230a and 230b are fixedly connected to the fixing unit 210, and the guide sockets 230a and 230b have guide socket holes 231*a* and 231*b*, respectively, into which the guide rods 232*a* and 232*b* are penetratively inserted.

Meanwhile, the fixing unit 210 has a cover unit 250 to protect the spindle socket 220 and the guide sockets 230*a* and 230*b*. The cover unit 250 has holes that communicate with the spindle socket hole 221 and the guide socket holes 231*a* and 231*b*, respectively.

The spindle 222 is disposed in the longitudinal direction and penetratively inserted into the spindle socket 220. A threaded portion is formed on an outer circumferential surface of the spindle 222. The threaded portion of the spindle 222 is thread-coupled to the thread corresponding portion formed on the inner circumferential surface of the spindle socket 220. Therefore, the spindle 222 may move in a threaded manner in the longitudinal direction with respect to the spindle socket 220 fixed to the fixing unit 210. In addition, a thread frictional force by the thread coupling is applied between the spindle 222 and the spindle socket 220. Here, a thread movement distance of the spindle 222 or a thread frictional force between the spindle 222 and the spindle socket 220 varies depending on a lead angle of the threaded portion or the thread corresponding portion.

One end of the spindle 222 is fixed to the first guide bracket 242. Therefore, the spindle 222 and the first guide bracket 242 move together. The second guide bracket 244 is connected to the first guide bracket 242. In an exemplary embodiment of the present invention, the first guide bracket 242 is in the form of a vertical member, and the second guide bracket 244 is in the form of a horizontal member. However, in another exemplary embodiment of the present invention, the first and second guide brackets 242 and 244 may have various shapes, and the first and second guide brackets 242 and 244 may be separately manufactured and then connected to each other or may be integrally manufactured.

The guide bearing 246 is rotatably connected to the second guide bracket 244. The guide bearing 246 may be inserted through the opening portion 115 of the lower guide rail 100 and then may move between the first and second lower guide sidewalls 111 and 112. The guide bearing 246 may rotate in a state of being in contact with the first and second lower guide sidewalls 111 and 112. Here, a rotation axis 247 of the guide bearing 246 is defined in the height direction of the vehicle body 2.

Meanwhile, the spindle 222 may be withdrawn from the spindle socket 220 while moving in the threaded manner. Therefore, according to an exemplary embodiment of the present invention, a spindle movement restriction unit 224 is fixedly connected to the other end of the spindle 222. When the spindle movement restriction unit 224, which moves together with the spindle 222, is caught by the spindle socket hole 221, the movement of the spindle 222 is restricted.

The guide rods 232*a* and 232*b* are disposed in the longitudinal direction at both sides of the spindle 222 and inserted into the guide sockets 230*a* and 230*b*. One end of each of the guide rods 232*a* and 232*b* is fixedly connected to the first guide bracket 242. Therefore, the guide rods 232*a* and 232*b* and the first guide bracket 242 move together.

Meanwhile, the guide rods 232*a* and 232*b* may be withdrawn from the guide sockets 230*a* and 230*b* while moving in the threaded manner. Therefore, according to an exemplary embodiment of the present invention, rod movement restriction units 234*a* and 234*b* are fixedly connected to the other end of the guide rod 232*a* and the other end of the guide rod 232*b*, respectively. When the rod movement restriction units 234*a* and 234*b*, which move together with the guide rods 232*a* and 232*b*, are caught by the guide socket holes 231*a* and 231*b*, the movements of the guide rods 232*a* and 232*b* are restricted.

Meanwhile, according to another exemplary embodiment of the present invention, the number of and the arrangement of the spindle 222, the spindle socket 220, the guide rods 232*a* and 232*b*, and the guide sockets 230*a* and 230*b* may be variously changed in number and arrangement. For example, one or multiple guide rods 232*a* and 232*b* and one or multiple guide sockets 230*a* and 230*b* may be provided at one side of the spindle 222 and the spindle socket 220, and two or more spindles 222 and two or more spindle sockets 220 may be provided.

Figure 8:
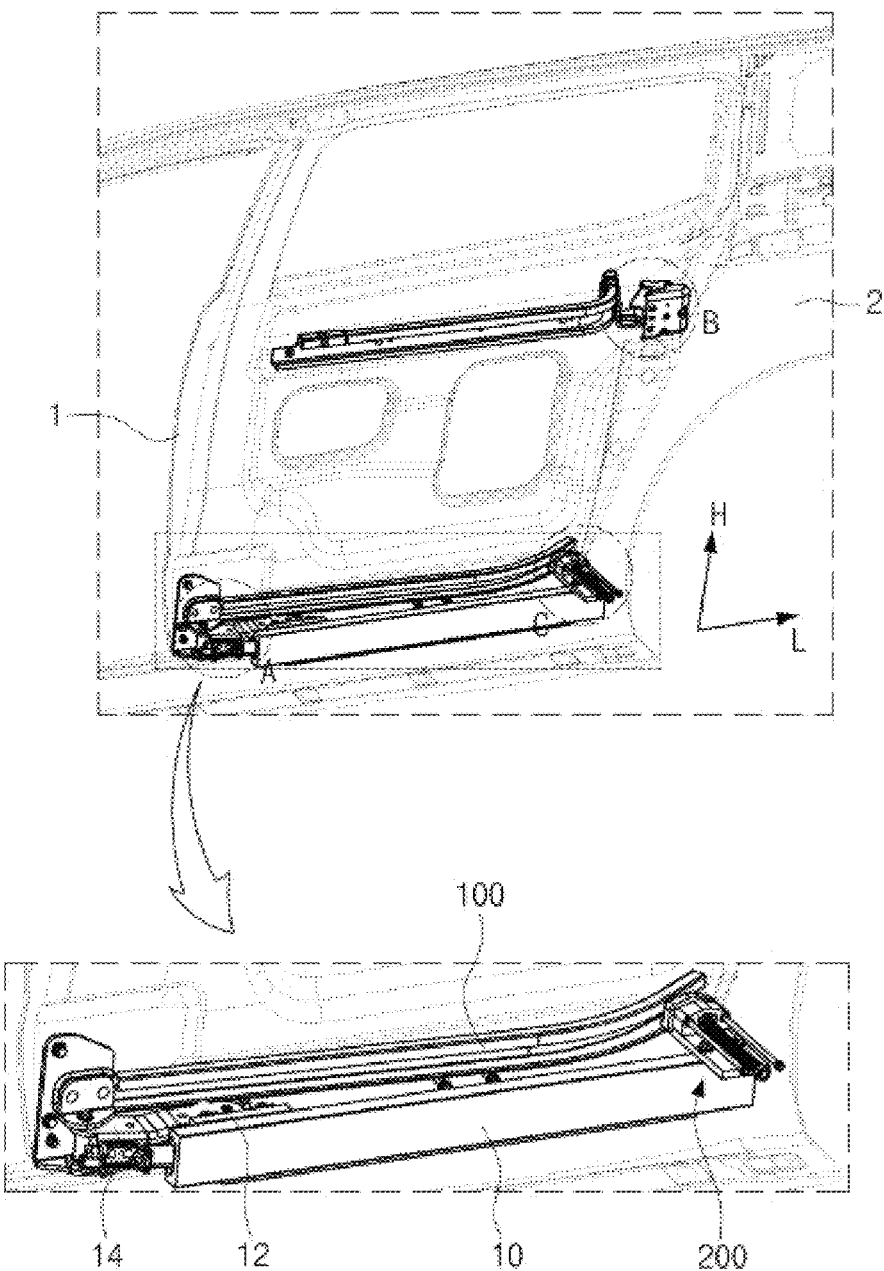
FIG. 8 is a view illustrating three support points at which a sliding door is supported by a spindle type sway prevention structure according to an exemplary embodiment of the present invention in a state in which the sliding door is closed.
Figure 9:
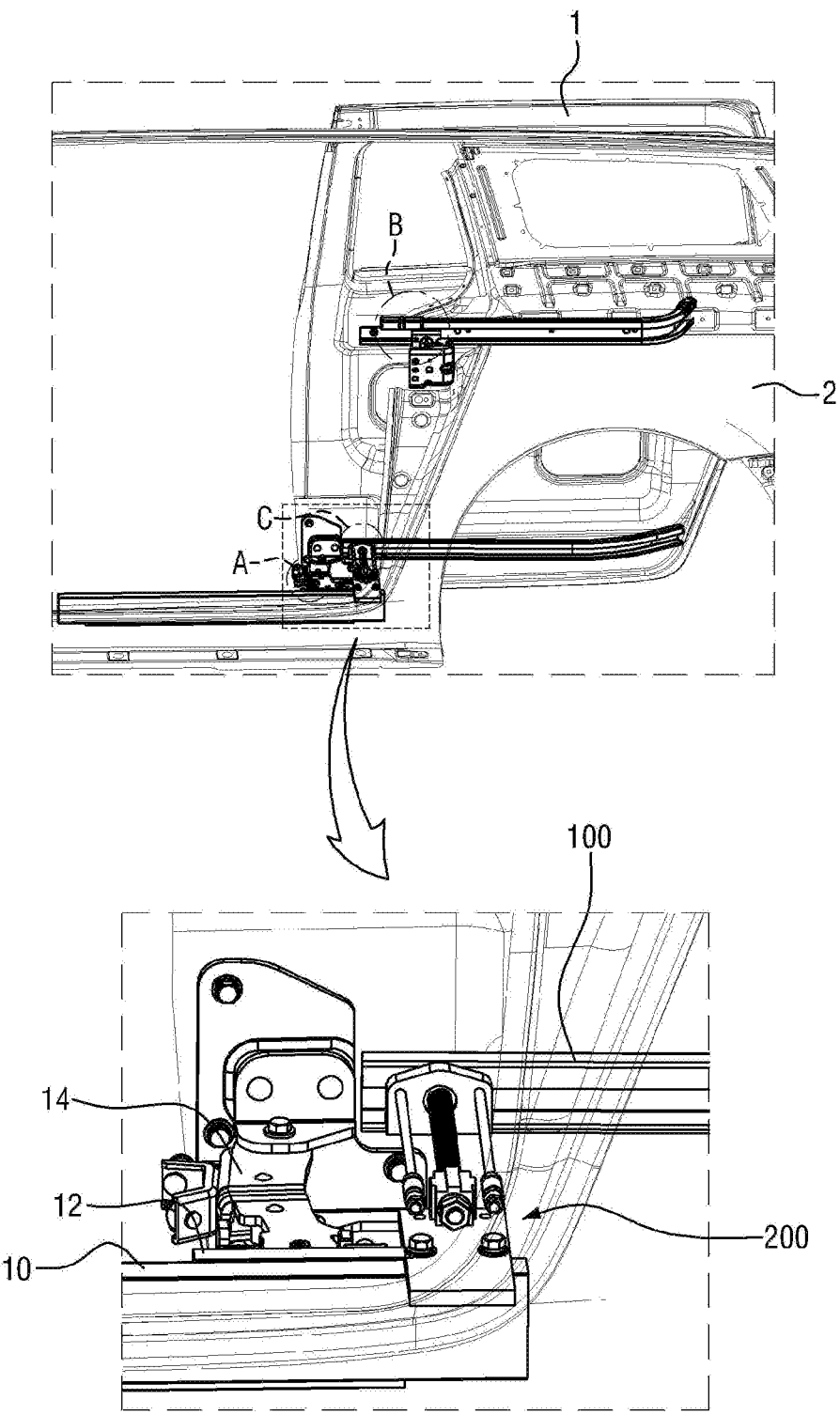
FIG. 9 is a view illustrating three support points at which a sliding door is supported by a spindle type sway prevention structure according to an exemplary embodiment of the present invention in the state in which the sliding door is opened.

FIG. 8 is a view illustrating three support points at which a sliding door is supported by a spindle type sway prevention structure according to an exemplary embodiment of the present invention in a state in which the sliding door is closed, and FIG. 9 is a view illustrating three support points at which a sliding door is supported by a spindle type sway prevention structure according to an exemplary embodiment of the present invention in a state in which the sliding door is opened.

Hereinafter, an operating process of a spindle type sway prevention structure according to an exemplary embodiment of the present invention and an operation of supporting the door will be described with reference to FIGS. 8 and 9.

FIG. 8 illustrates that in the state in which the door 1 is closed, the lower rail roller unit 12 connected to the lower rail 10 is positioned at one side (the left side in FIG. 8), and the lower rail swing arm 14 connected to the lower rail roller unit 12 is completely rotated in one direction. Further, the fixing unit 210 of the spindle assembly 200 is fixed to the vehicle body 2, and the guide bearing 246 of the spindle assembly 200 is connected to the lower guide rail 100 fixed to the door 1. In this case, the guide bearing 246 is positioned on the curved portion 130 of the lower guide rail 100. Therefore, the door 1 and the vehicle body 2 are connected to each other through the spindle assembly 200.

Because the curved portion 130 of the lower guide rail 100 is curved in a direction toward the door 1, a distance between the door 1 and the vehicle body 2 is shortest in the state in which the door 1 is closed. This state is a state in which the spindle 222 is completely moved in the threaded manner in the direction toward the vehicle body 2.

When the door 1 moves to be opened, the lower rail roller unit 12 moves to the other side of the lower rail 10 (to the right in FIG. 8), and the lower rail swing arm 14 rotates in the other direction. In this case, the guide bearing 246 moves along the lower guide route formed in the curved portion 130, and the distance between the door 1 and the vehicle body 2 is gradually increased along the curve of the curved portion 130. In this case, the spindle 222 moves slowly in the threaded manner in the direction toward the door 1, and the sway of the door 1 is prevented by the thread movement of the spindle 222 and the thread frictional force. Here, the guide rods 232*a* and 232*b* guide the spindle 222 so that the spindle 222 stably moves in the threaded manner in the direction toward the door 1. In respect to the door 1, the thread movement of the spindle 222 may be considered as an operating distance, and the thread frictional force may be considered as an operating force. Here, the operating force is a supporting force for supporting the door 1. Thereafter, the guide bearing 246 moves along the lower guide route formed on the straight portion 120.

The guide bearing 246 rotates in a state of being in contact with the first and second lower guide sidewalls 111 and 112. Here, the first and second lower guide sidewalls 111 and 112 are formed in the width direction (L direction) of the vehicle body 2 and restrict the guide bearing 246, such that the door 1 is prevented from swaying in the L direction while the door 1 moves.

A load or the like is applied in the height direction (H direction) of the vehicle body 2 by a weight of the door 1 or an external force. Here, the lower guide upper wall 113 and the lower guide lower wall 114 are formed in the height direction (H direction) of the vehicle body 2 and restrict the guide bearing 246, such that the door 1 is prevented from swaying in the H direction while the door 1 moves.

The door 1 is supported at three support points in the state in which the door 1 is closed, and the three support points include a contact point A between the lower rail 10 and the lower rail roller unit 12, a contact point B between the center rail 20 and the center rail roller unit 22, and a contact point C between the guide bearing 246 and the lower guide rail 100. The three support points A, B, and C define an approximately triangular shape. Because the three support points are continuously maintained even in the state in which the door 1 is opened, the door 1 is stably supported, and the door 1 is prevented from swaying.

FIG. 9 illustrates that in the state in which the door 1 is completely opened, the lower rail roller unit 12 is positioned at the other side of the lower rail 10 (the right side in FIG. 9), and the lower rail swing arm 14 is completely rotated in the other direction. When the guide bearing 246 is positioned on the straight portion 120, the distance between the door 1 and the vehicle body 2 is longest. This state is a state in which the spindle 222 is completely moved in the threaded manner in the direction toward the door 1.

The support points A, B, and C still maintain the triangular shape even in the state in which the door 1 is completely opened, as a result of which the door 1 is stably supported.

Meanwhile, an operating process reverse to the above-mentioned operating process of the spindle type sway prevention structure is performed when the door 1 switches from the opened state to the closed state.

Figure 10:
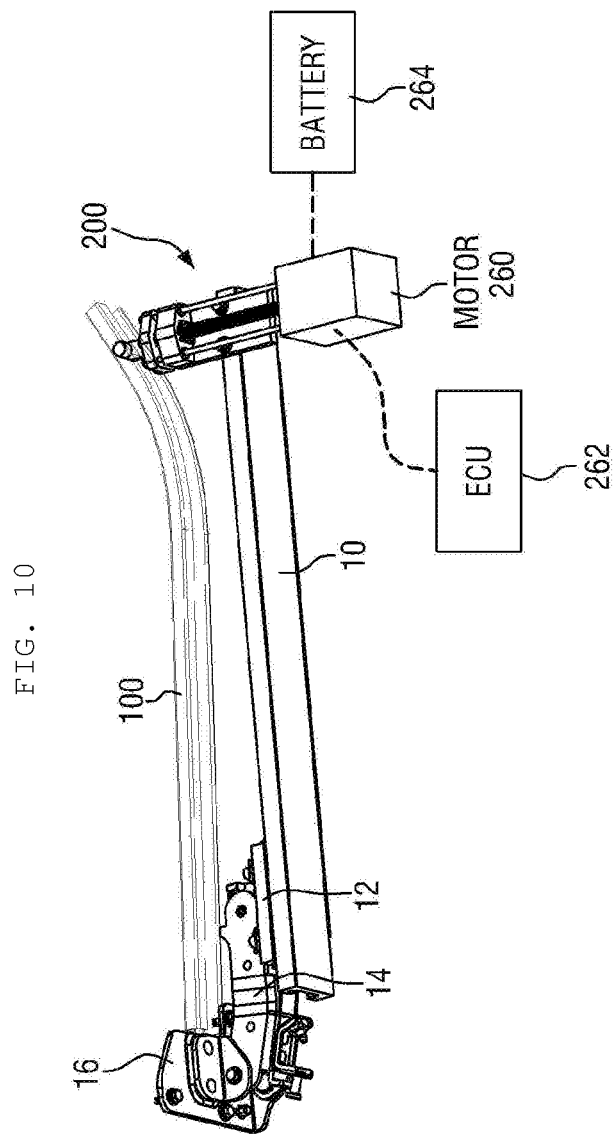
FIG. 10 is a view illustrating a spindle type sway prevention structure according to another exemplary embodiment of the present invention.

FIG. 10 is a view illustrating a spindle type sway prevention structure according to another exemplary embodiment of the present invention.

The spindle type sway prevention structure according to another exemplary embodiment of the present invention includes a motor 260 configured to move the spindle 222 in the threaded manner, and a control unit (ECU) 262 configured to generate a control signal for controlling the motor 260 based on the position of the guide bearing 246 on the lower guide route.

Another exemplary embodiment of the present invention may further include a sensing unit (not illustrated) configured to measure the position of the guide bearing 246 on the lower guide route. The control unit 262 receives an output value from the sensing unit (not illustrated), determines a rotation amount and a rotation direction of the motor 260, and applies a control signal to the motor 260. Here, the motor 260 is supplied with electric power from a battery 264.

With the above-mentioned configuration, the operating distance between the door 1 and the vehicle body 2, the operating force applied to the door 1, and the operating direction of the door 1 may be more precisely adjusted, as a result of which the sway of the door 1 may be assuredly prevented.

The present invention has been described with reference to the limited exemplary embodiments and the drawings, but the present invention is not limited thereto. The described exemplary embodiments may be variously changed or modified by those skilled in the art to which the present invention pertains within the technical spirit of the present invention and within the scope equivalent to the appended claims.

What is claimed is:

1. An apparatus comprising:
    a lower rail mounted at a lower side of a vehicle body and extending in a longitudinal direction of the vehicle body;
    a lower rail roller unit rollably connected to the lower rail;
    a lower rail swing arm rotatably connected to the lower rail roller unit and configured to be connected to a door;
    a lower guide rail mounted on the door and configured to form a lower guide route in the longitudinal direction; and
    a spindle assembly positioned at one end of the lower rail, the spindle assembly comprising:
        a spindle extending in a direction generally transverse to the longitudinal direction and connected to a fixing unit fixed to the vehicle body, the spindle having one end rollably connected to the lower guide rail and having a threaded portion formed on an outer circumferential surface thereof, wherein the spindle is configured to be movable between the vehicle body and the door;
        a spindle socket fixedly connected to the vehicle body and having an inner circumferential surface thread-coupled to the spindle;
        a guide bracket fixedly connected to the one end of the spindle;
        a guide bearing rotatably connected to the guide bracket; and
        a guide rod having one end connected to the guide bracket, the guide rod being parallel to the spindle and configured to guide a movement of the spindle.

2. The apparatus of claim 1, wherein a lower guide groove is formed in the lower guide rail, wherein the guide bearing is inserted into the lower guide groove.

3. The apparatus of claim 1, wherein a rotation axis of the guide bearing extends in a height direction of the vehicle body.

4. The apparatus of claim 1, further comprising a guide socket fixedly connected to the vehicle body and having an inner circumferential surface configured to guide the guide rod.

5. The apparatus of claim 4, further comprising a spindle movement restriction unit fixedly connected to the other end of the spindle, the spindle movement restriction unit configured to restrict movement of the spindle by engaging the spindle socket.

6. The apparatus of claim 5, further comprising a rod movement restriction unit fixedly connected to the other end of the guide rod, the rod movement restriction unit configured to restrict movement of the guide rod by engaging the guide socket.

7. The apparatus of claim 1, wherein the guide rod is provided at a first side of the spindle and a second guide rod is provided at a second side of the spindle.

8. The apparatus of claim 1, wherein a thread movement distance of the spindle or a thread frictional force between the spindle and the spindle socket is adjusted by changing a lead angle of the threaded portion.

9. The apparatus of claim 1, further comprising:
    a motor configured to rotate the spindle in a forward direction or a rearward direction; and a control unit configured to control a rotation amount or a rotation direction of the motor based on a position of the one end of the spindle on the lower guide route.

10. The apparatus of claim 1, further comprising:
a center rail formed at a middle portion of the door; and
a center rail roller unit connected to the center rail.

11. The apparatus of claim 10, wherein the door is supported at three support points, the three support points comprising a first contact point between the lower rail and the lower rail roller unit, a second contact point between the center rail and the center rail roller unit, and a third contact point between the guide bearing and the lower guide rail.

12. A vehicle comprising:
a vehicle body;
a door;
a lower rail mounted at a lower side of the vehicle body and extending in a longitudinal direction of the vehicle body;
a lower rail roller unit rollably connected to the lower rail;
a lower rail swing arm rotatably connected to the lower rail roller unit and the door;
a lower guide rail mounted on the door and configured to form a lower guide route in the longitudinal direction; and
a spindle assembly positioned at one end of the lower rail, the spindle assembly comprising:
a spindle extending in a direction generally perpendicular to the longitudinal direction and connected to a fixing unit fixed to the vehicle body, the spindle having one end rollably connected to the lower guide rail, and having a threaded portion formed on an outer circumferential surface thereof, wherein the spindle is configured to be movable between the vehicle body and the door;
a spindle socket fixedly connected to the vehicle body and having an inner circumferential surface thread-coupled to the spindle;
a guide bracket fixedly connected to the one end of the spindle;
a guide bearing rotatably connected to the guide bracket; and
a guide rod having one end mounted to the guide bracket, the guide rod being parallel with the spindle and configured to guide a movement of the spindle.

13. The vehicle of claim 12, further comprising a guide socket fixedly connected to the vehicle body and having an inner circumferential surface configured to guide the guide rod.

14. The vehicle of claim 13, further comprising a spindle movement restriction unit fixedly connected to the other end of the spindle, the spindle movement restriction unit configured to restrict movement of the spindle by engaging the spindle socket.

15. The vehicle of claim 14, further comprising a rod movement restriction unit fixedly connected to the other end of the guide rod, the rod movement restriction unit configured to restrict movement of the guide rod by engaging the guide socket.

16. The vehicle of claim 12, further comprising:
a motor configured to rotate the spindle in a forward direction or a rearward direction; and
a control unit configured to control a rotation amount or a rotation direction of the motor based on a position of the one end of the spindle on the lower guide route.

17. An apparatus comprising:
a spindle having a threaded portion formed on an outer circumferential surface thereof, wherein the spindle is configured to be movable between a vehicle body and a door slidably connected to the vehicle body;
a spindle socket fixedly connected to the vehicle body and having an inner circumferential surface thread-coupled to the spindle;
a guide bracket fixedly connected to one end of the spindle;
a guide bearing rotatably connected to the guide bracket and the door; and
a guide rod having one end mounted to the guide bracket, the guide rod being disposed in parallel with a longitudinal direction of the spindle which extends transverse to a longitudinal direction of the vehicle body and the guide rod being configured to guide a movement of the spindle.

18. The apparatus of claim 17, further comprising a guide socket fixedly connected to the vehicle body and having an inner circumferential surface configured to guide the guide rod.

19. The apparatus of claim 18, further comprising:
a spindle movement restriction unit fixedly connected to the other end of the spindle, the spindle movement restriction unit configured to restrict movement of the spindle by engaging the spindle socket; and
a rod movement restriction unit fixedly connected to the other end of the guide rod, the rod movement restriction unit configured to restrict movement of the guide rod by engaging the guide socket.

20. The apparatus of claim 17, wherein a thread movement distance of the spindle or a thread frictional force between the spindle and the spindle socket is adjustable by changing a lead angle of the threaded portion.

* * * * *